United States Patent [19]

Fischer

[11] 4,106,601

[45] Aug. 15, 1978

[54] CONTROL DEVICE

[75] Inventor: Walter Fischer, Melle, Fed. Rep. of Germany

[73] Assignee: WF "Rational" Anbaükuchen Walter Fischerriemsloh, Melle, Fed. Rep. of Germany

[21] Appl. No.: 783,932

[22] Filed: Apr. 4, 1977

[51] Int. Cl.² .............................................. F16D 67/00
[52] U.S. Cl. ...................................... 192/3 S; 74/512
[58] Field of Search ........................... 192/3 R, 3 S, 1; 74/512, 471 R

[56] References Cited

U.S. PATENT DOCUMENTS

| 2,111,686 | 3/1938 | Warren | 192/3 S |
|---|---|---|---|
| 2,131,972 | 10/1938 | Ruhstorfer | 192/3 S |
| 2,281,755 | 5/1942 | Dunning | 192/3 S |
| 3,709,338 | 1/1973 | Glen | 74/512 |

Primary Examiner—Edgar W. Geoghegan
Attorney, Agent, or Firm—William Anthony Drucker

[57] ABSTRACT

A mechanism for control of fuel feed, and for the application of the brakes of motor vehicles with manual or automatic gear change.

A single spring-loaded foot pedal, held in idling position, is connected to fuel feed and to brake mechanism. When pressure on it is released the fuel feed is opened continuously, and when it is depressed completely the fuel feed is throttled down to idling. When it is depressed beyong idling position, the brakes are operated, and when it is released, the brakes are released.

5 Claims, 4 Drawing Figures

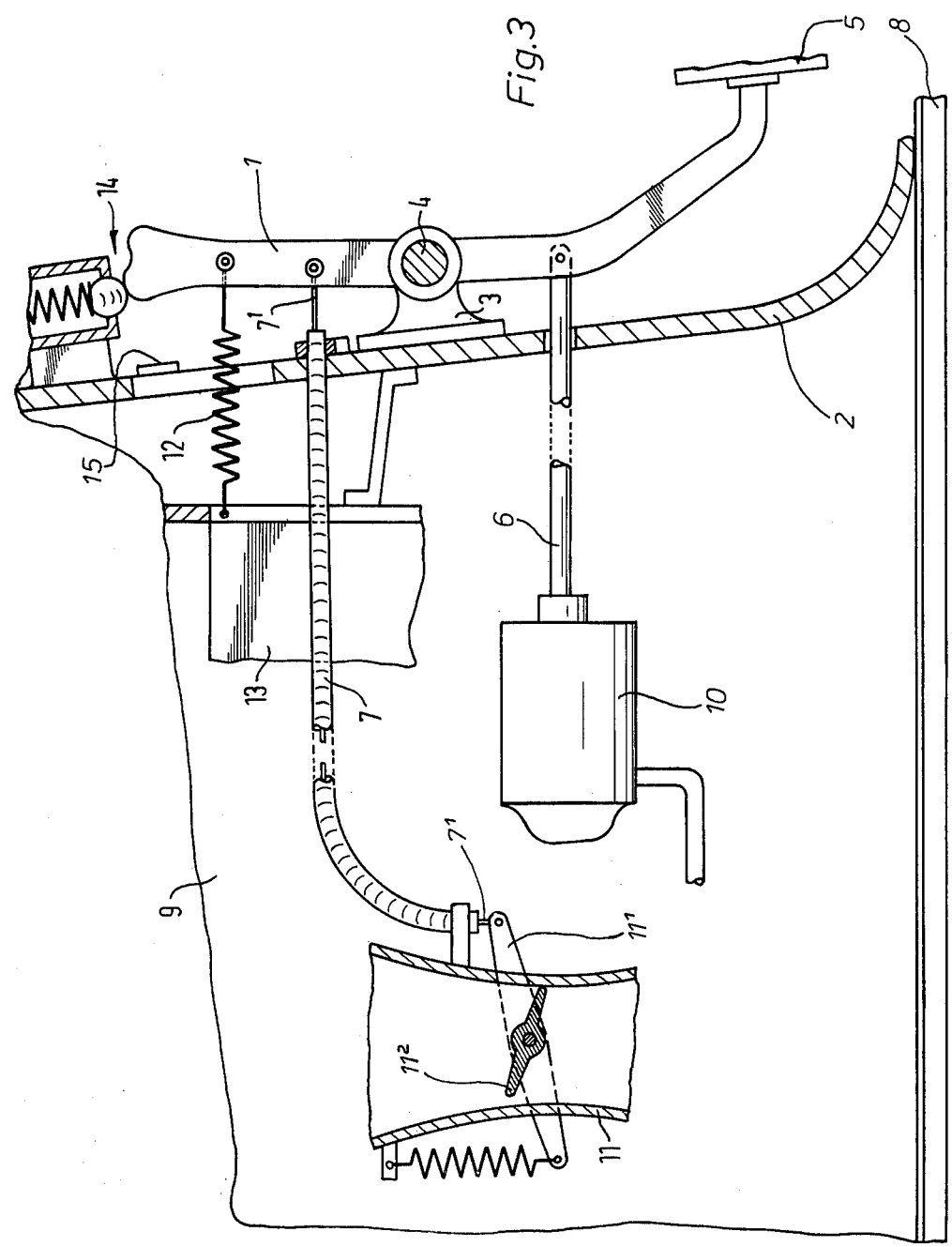

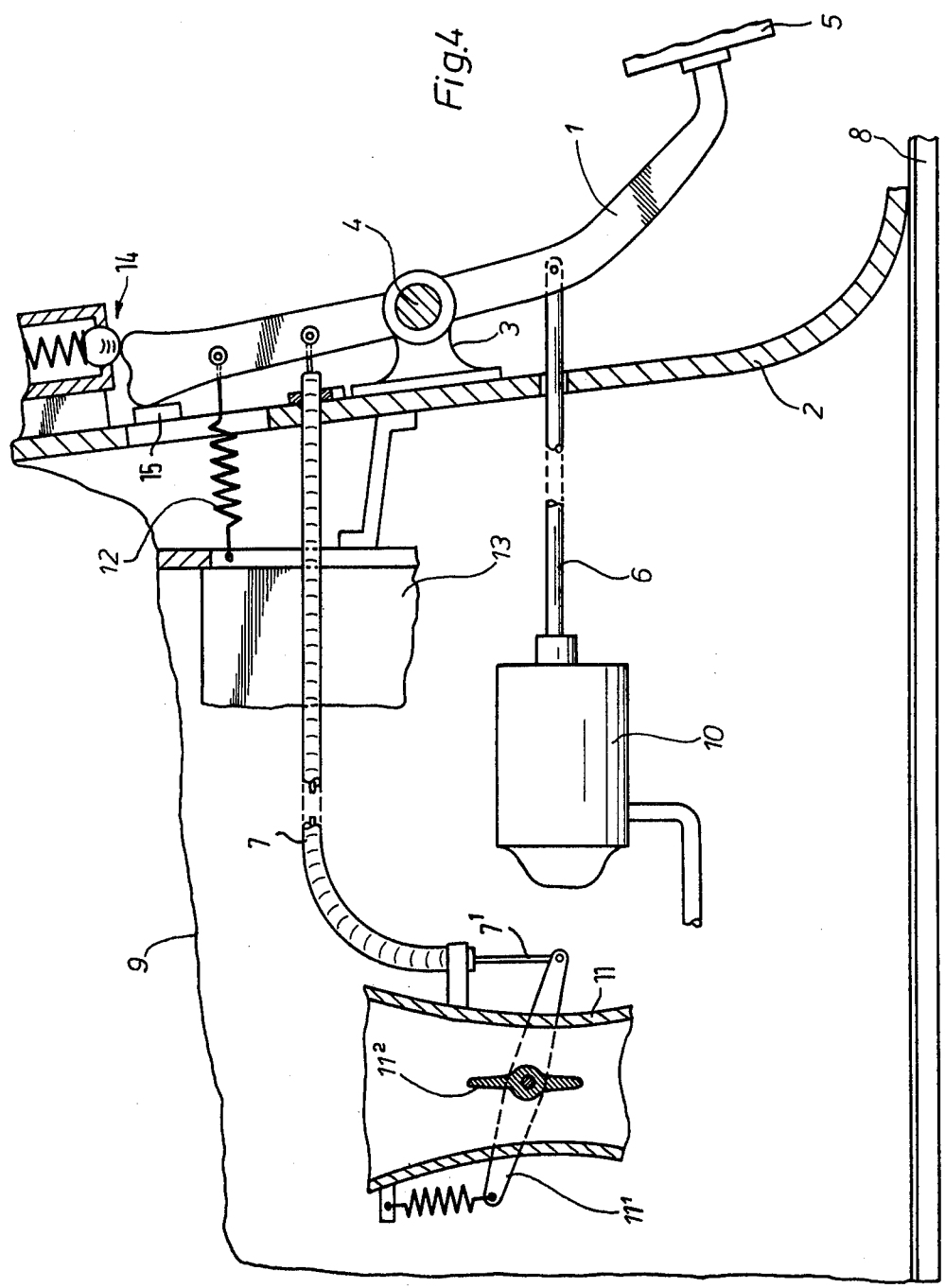

CONTROL DEVICE

The Invention refers to a device for the control of the fuel feed as well as for the operation of the brakes in front and rear engine driven vehicles with manual or automatic gear boxes.

It is common practice to use separate foot pedals for speed control and for the application of the brakes, these pedals being mounted next to each other on the vehicle frame and having to be pressed down for the initiation of an acceleration or braking process.

The pedal types known show shortcomings which can result in serious consequences, such as e.g. accidents through cars driving into the back of others. This applies to front or rear engine driven motor vehicles with manual or automatic gear boxes.

Since the same foot of the driver has to alternately depress the accelerator pedal and the brake pedal, time is lost if — for the purpose of braking — the foot first has to be taken off the accelerator pedal and placed on the adjacent brake pedal. In sudden danger situations, considerable time delays can occur in the operation of the pedal caused by reactions of shock. Many accidents can be attributed to the fact that in the event of fast driving, the driver's time of reaction does not suffice for a fast and safe operation of the brakes in the event of danger. It may even be possible that the driver, in a situation of shock, unwittingly omits a pedal change for the initiation of a braking process and, instead of applying the brakes, fully opens the fuel feed and accelerates his vehicle, since the human body — in particular arms and legs — tends to straighten in situations of shock. The vehicle is then steered into the danger zone at increased speed.

A further disadvantage of known pedal types and mountings lies in the fact that on a slope, starting is not possible without using the handbrake, since the adjacent pedals cannot be operated by one foot at the same time. During long continuous fast driving it is tiring for the driver if he has to keep one foot continuously on the accelerator pedal. In this case, only the foot assigned to the clutch pedal can be moved freely.

In contrast to the right foot which has to initiate two separate functions (acceleration and braking), the left foot only has to operate the clutch. This may not apply if the motor vehicle is equipped with fully automatic gear box without a clutch pedal. This type of vehicle offers itself for leg-amputated drivers. On the other hand, no suitable solutions have become known for a simple and safe operation of the pedals used for fuel feed and brake application.

It is the aim of the Invention to provide a device for motor vehicles for the control of the fuel feed and for the application of the brakes, a device which is designed and constructed in such a way that, in a simple, safe and fast manner without the basic position of the foot having to be changed, a braking process and an independent acceleration process can be initiated with one foot, with the change between acceleration and braking taking place in the shortest possible time.

According to the Invention, this aim is achieved by a single spring-pressure foot lever in form of a pedal in arrested idling position, this pedal being connected via transmission means both to the fuel feed as well as to the braking mechanism, i.e. in such a way that the fuel feed is opened continuously when the pressure on the pedal is released from the idling position, and the fuel feed is throttled to the idling position when the pedal is depressed, and that in the event of the pedal being depressed beyond the idling position, the braking mechanism is put into continuous operation and in the event of the pressure on the pedal being released, the braking mechanism is put out of action.

It is furthermore intended that these transmission means arranged between pedal and fuel feed be designed as transmission shafts, toggle joints, gear wheels, chain drives or belts.

The transmission means arranged between pedal and braking mechanism are preferably designed in the form of transmission shafts, toggle joints, gear wheels or chain drives.

A further feature of the Invention is the arrest of the pedal in the idling position, this being developed in form of a ball notch, a spring catch or a ratchet.

It should finally be mentioned that the spring connected with the pedal is designed as a looped spring, a coil spring or a spiral spring.

The following description is to further explain the Invention, with embodiments of the Invention being illustrated in the drawings, of which:

FIG. 3 shows another pedal mechanism in the position of smallest fuel feed and braking;

FIG. 4 shows the pedal mechanism as per FIG. 3 in the position of maximum fuel feed.

Figure 1:
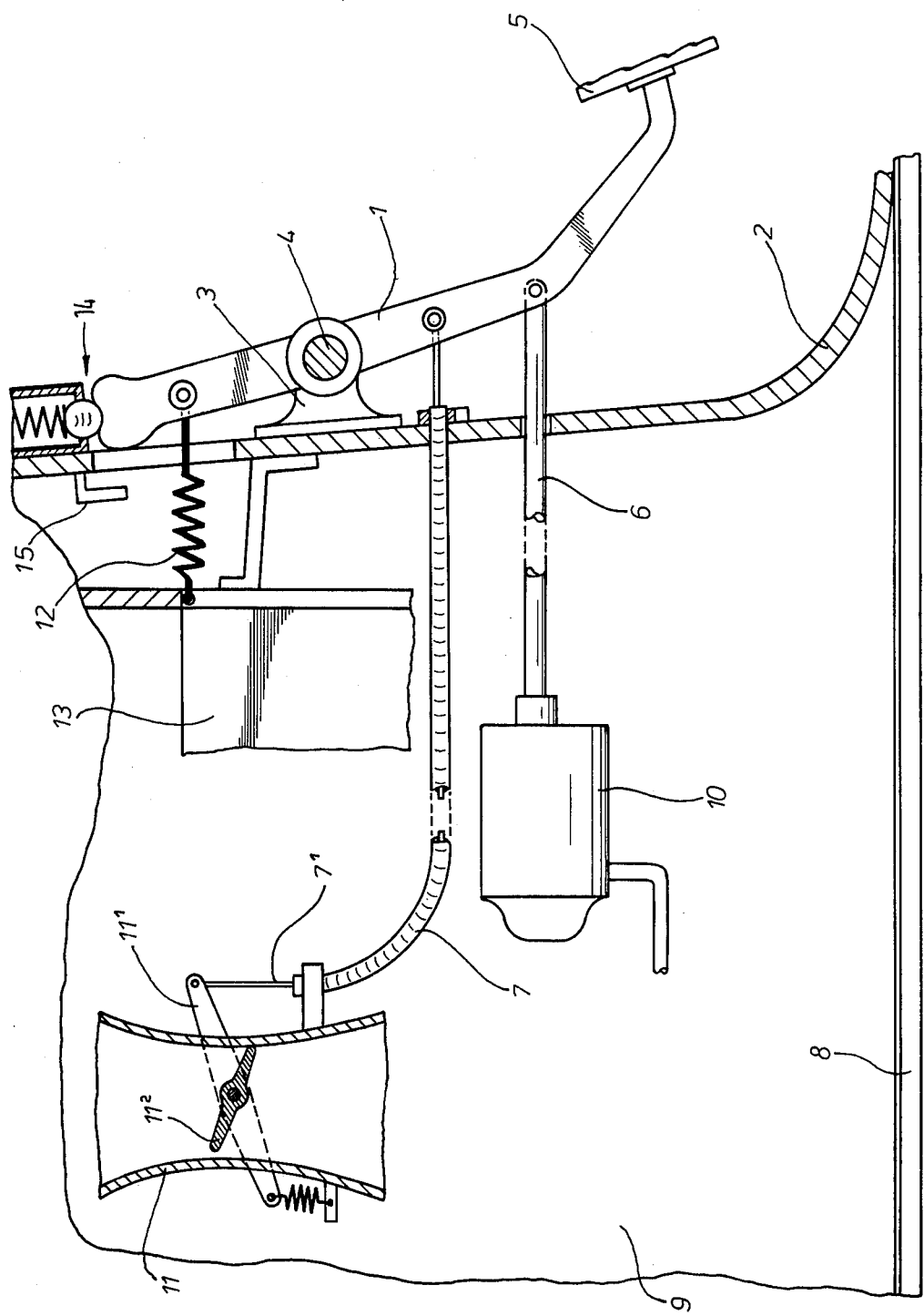
FIG. 1 shows a pedal mechanism for fuel feed control and brake operation on a motor vehicle, in the idling position.

According to FIG. 1, the mechanism comprises a foot lever in form of a pedal 1, which is mounted in the driver's foot area on the bottom plate 2 of the vehicle and is pivoted in a supporting frame 3 by means of a trunnion 4. At the lower end of the pedal, 1, a foot plate 5 is arranged for contacting by the driver's foot when braking.

The pedal 1 controls both the fuel feed (carburettor 11) as well as the brake mechanism (brake cylinder 10). The pedal arm of pedal 1 connected with the foot plate 5, is flexibly connected with the transmission shaft 6 and with a Bowden cable $7^1$ running through a protective pipe 7. Transmission shaft 6 and Bowden cable $7^1$ are conducted through the vehicle bottom plate 2 into the engine area bound by the chassis 8 and laterally by the vechicle body 9, whereby the transmission shaft 6 is connected with the plunger of brake cylinder 10 for the application of the brakes which are not shown, and whereby the Bowden cable $7^1$ is connected for the fuel feed control to a spring-loaded adjusting lever $11^1$ on the Carburettor 11 for the throttle valve $11^2$.

Figure 2:
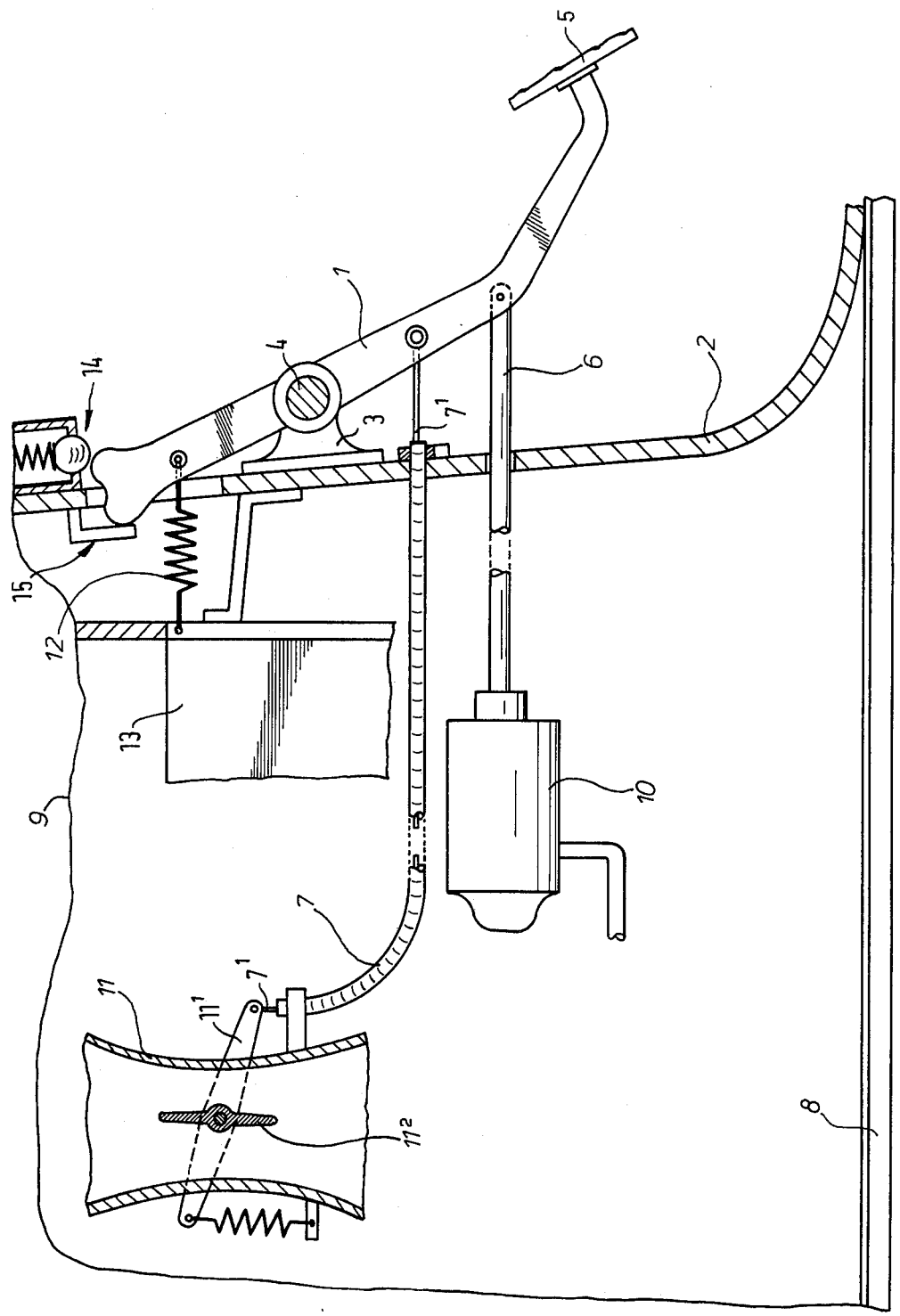
FIG. 2 shows the pedal mechanism as per FIG. 1 in the position of maximum fuel feed.

At the other pedal lever arm, a tension spring 12 is acting, which continuously tries to turn the pedal 1 against the forward drive direction of the vehicle towards the direction of maximum fuel feed (FIG. 2). On the other side, the tension spring 12 is removably attached to an extension piece 13 connected to the body wall 9 and the vehicle bottom plate 2.

In accordance with FIG. 1, the pedal 1 is in the arrested idling position without the brake having been applied. A ball notch 14 — whose spring-loaded stop ball falls into a stop notch at the pedal lever end — above the pedal lever end connected with the tension spring 12 is intended for releasably retaining the pedal 1 in this position. A light touch of the pedal 1 in the forward driving direction releases the pedal 1.

With the driving motor in the idling position, the throttle valve 11² almost completely seals the Venturi tube of the Carburettor 11 and thus throttles the fuel feed to the fuel minimum required for idling. The brake cylinder 10 of the brake mechanism, too, is still out of action in this position so that the brakes are not being applied. A braking operation does not occur until the pedal 1 is depressed beyond the idling position (FIG. 3). This results in the brake cylinder 10 being put into continuous operation. When the pressure on pedal 1 is released, the brake mechanism is again put out of operation.

FIG. 2 and FIG. 4 show the pedal 1, after release of the arrest, in the position of maximum fuel feed, with the throttle valve 11² being completely open and the fuel feed being set to fuel maximum. This pedal position is limited through a projection 15 on the vehicle floor plate 2. A swing of pedal 1 beyond this full-throttle position is not possible.

By releasing the pressure on the pedal 1 from the idling position (FIG. 1), the fuel feed is opened continuously up to full throttle position whilst, when depressing the pedal against the force of the tension spring 12, the fuel feed is throttled to the idling position and the brakes are being applied continuously.

According to a further embodiment of the Invention (FIGS. 3 and 4), the transmission shaft 6 and the Bowden cable 7¹ are mounted on two separate pedal lever arms of pedal 1. The Bowden cable 7¹ is connected to that pedal arm which also carries the tension spring 12. The stop 15 prevents a swing of the pedal 1 beyond the full throttle position (FIG. 4), whilst the position of pedal 1 — for idling — can be arrested via the ball notch 14. This can take place no matter whether the vehicle is stationary or moving. Here too, a slight touching of pedal 1 releases the arrest.

The exemplified embodiments are designed for a front engine driven motor vehicle with suspended foot pedal. With a different mounting, the pedal can also be used in rear-engine driven motor vehicles with manual or automatic gear boxes. The Bowden cable 7¹ arranged between the fuel feed (carburettor 11) and the pedal 1 as a means of transmission of the pedal movement, could also be developed as a toggle joint, gear drive or chain drive. This also applies to the transmission means for the brake mechanism.

It is also possible to use a looped or a coil spring instead of the tension spring 12 for moving the pedal 1, whereby the use of a ratchet, an eccentric or a spring catch is also suitable for retaining the pedal 1 in the idling position.

The main advantage of the Invention can be seen in that the original basic foot position can be maintained both for the acceleration of the vehicle (opening up of engine) as well as for applying the brakes. This results in a reduction by half or more than half of the time of reaction required from the moment of recognising a possible danger to the application of the brakes.

Without having to change over the foot, the brakes can be applied instantly from the basic position whereby, for the braking process, the force of the foot can be transferred without any delay to the sole pedal. The chance of the foot assuming an inclined position during the braking process, which would mean a considerable loss of force, is eliminated by the mechanism of the Invention.

I claim:

1. Mechanism, for the control of the fuel feed and for the application of the brakes of front or rear engine driven motor vehicles with manual or automatic gear boxes, comprising a single spring-loaded foot lever in form of a pedal in arrested idling position, said pedal being connected via transmission means both to a fuel feed and to a brake mechanism such that, when the pressure on the pedal is released from the idling position, the fuel feed is opened continuously, and such that when the pedal is depressed completely, the fuel feed is throttled to the idling position, and such that when the pedal is depressed beyond the idling position, the brake mechanism is put into continuous operation, and such that when the pressure on the pedal is released, the brake mechanism is put out of operation.

2. Mechanism, as claimed in claim 1, wherein the transmission arranged between pedal and fuel feed is a transmission shaft, toggle joint, gear drive, chain drive or belt.

3. Mechanism, as claimed in claim 1, wherein the transmission means arranged between pedal and brake mechanism is a transmission shaft, toggle joint, gear drive or chain drive.

4. Mechanism, as claimed in claim 1, wherein the arrest of the pedal in the idling position is obtained by a ball notch, spring catch, ratchet or eccentric.

5. Mechanism, as claimed in claim 1, wherein the spring connected to the pedal is a looped, coil or spiral spring.

* * * * *